(12) United States Patent
Burke

(10) Patent No.: US 9,059,659 B2
(45) Date of Patent: Jun. 16, 2015

(54) METHOD AND SYSTEM FOR MEASURING A CHARACTERISTIC OF AN ELECTRIC MOTOR

(75) Inventor: Richard Thomas Burke, Rotherwick (GB)

(73) Assignee: Protean Electric Limited (GB)

( * ) Notice: Subject to any disclaimer, the term of this patent is extended or adjusted under 35 U.S.C. 154(b) by 0 days.

(21) Appl. No.: 13/501,699

(22) PCT Filed: Sep. 29, 2010

(86) PCT No.: PCT/IB2010/054395
§ 371 (c)(1),
(2), (4) Date: Apr. 12, 2012

(87) PCT Pub. No.: WO2011/045698
PCT Pub. Date: Apr. 21, 2011

(65) Prior Publication Data
US 2012/0206073 A1    Aug. 16, 2012

(30) Foreign Application Priority Data

Oct. 15, 2009  (GB) .................................. 0918083.7

(51) Int. Cl.
*H02P 7/00* (2006.01)
*H02P 25/22* (2006.01)
(Continued)

(52) U.S. Cl.
CPC ...... *H02P 25/22* (2013.01); *H02K 3/28* (2013.01); *H02K 11/0073* (2013.01); *H02K 16/04* (2013.01); *H02K 29/12* (2013.01); *H02K 41/031* (2013.01); *H02K 2213/06* (2013.01); *H02K 2213/12* (2013.01); *H02P 6/16* (2013.01);
(Continued)

(58) Field of Classification Search
USPC ............ 318/685, 696, 363, 368, 400.12, 139, 318/400.23, 400.29, 400.04, 400.38, 650, 318/798, 803; 324/339, 76.77, 765.01; 310/112, 114, 268, 260, 185, 400.01, 310/166, 162, 184, 179, 216.04, 216.009
See application file for complete search history.

(56) References Cited

U.S. PATENT DOCUMENTS 4,132,931 A * 1/1979 Okuyama et al. ............. 318/732
4,282,471 A * 8/1981 Budniak et al. ............... 318/685
(Continued)

FOREIGN PATENT DOCUMENTS

GB    2456349 A * 7/2009
JP    2005039932 A * 2/2005

OTHER PUBLICATIONS

Intellectual Property Office, UK Office Action, Nov. 11, 2009.

*Primary Examiner* — Eduardo Colon Santana
*Assistant Examiner* — Jorge L Carrasquillo
(74) *Attorney, Agent, or Firm* — The Mason Group Patent Specialists LLC; Valerie M. Davis

(57) ABSTRACT

A control system for an electric motor having a first control device arranged to control current in a first coil set for generating a first torque on a rotor and a second control device arranged to control current in a second coil set for generating a second torque on the rotor, the system comprising a controller arranged to instruct the first control device to control current in the first coil set to generate a torque on the rotor to allow rotation of the rotor; and means for measuring a characteristic associated with the second coil set resulting from the rotation of the rotor from the torque generated by the first coil set while substantially no current is flowing in the coils of the second coil set.

8 Claims, 6 Drawing Sheets

(51) Int. Cl.
*H02K 3/28* (2006.01)
*H02K 11/00* (2006.01)
*H02K 29/12* (2006.01)
*H02P 6/16* (2006.01)
*H02P 6/18* (2006.01)
*B60L 15/00* (2006.01)
*B60L 15/02* (2006.01)
*B60L 15/20* (2006.01)
*H02K 16/04* (2006.01)
*H02K 41/03* (2006.01)

(52) U.S. Cl.
CPC .............. *H02P6/182* (2013.01); *B60L 15/007* (2013.01); *B60L 15/025* (2013.01); *B60L 15/2045* (2013.01); *B60L 2220/14* (2013.01); *B60L 2220/44* (2013.01); *B60L 2270/142* (2013.01); *B60L 2270/145* (2013.01); *Y02T 10/7283* (2013.01); *Y02T 10/643* (2013.01); *Y02T 10/641* (2013.01)

(56) References Cited

U.S. PATENT DOCUMENTS

| | | | |
|---|---|---|---|
| 4,373,148 A * | 2/1983 | Gutz | 318/400.41 |
| 4,434,389 A * | 2/1984 | Langley et al. | 318/400.41 |
| 5,811,905 A * | 9/1998 | Tang | 310/179 |
| 6,046,554 A | 4/2000 | Becerra | |
| 6,552,463 B2 * | 4/2003 | Oohashi et al. | 310/207 |
| 7,288,956 B2 * | 10/2007 | De Cock et al. | 324/765.01 |
| 8,212,512 B2 * | 7/2012 | Maeda et al. | 318/432 |
| 2004/0021437 A1 * | 2/2004 | Maslov et al. | 318/254 |
| 2004/0200057 A1 * | 10/2004 | Maslov et al. | 29/596 |
| 2005/0045392 A1 * | 3/2005 | Maslov et al. | 180/65.5 |
| 2005/0093520 A1 * | 5/2005 | Muramatsu et al. | 322/29 |
| 2005/0127856 A1 * | 6/2005 | Maslov | 318/254 |
| 2005/0151491 A1 * | 7/2005 | Nakai et al. | 318/98 |
| 2008/0218113 A1 * | 9/2008 | Cox et al. | 318/490 |
| 2009/0128084 A1 * | 5/2009 | Johnson et al. | 318/806 |
| 2011/0057591 A1 * | 3/2011 | Tagome et al. | 318/400.23 |

* cited by examiner

METHOD AND SYSTEM FOR MEASURING A CHARACTERISTIC OF AN ELECTRIC MOTOR

The present invention relates to a method and system for measuring a characteristic of an electric motor.

Electric motor systems typically include an electric motor and control unit arranged to control the power of the electric motor.

An example of a known type of electric motor is a synchronous brushless permanent magnet electric motor, where synchronous brushless permanent magnet electric motors avoid the need for commutator brushes required in brushed DC electric motors.

However, without the use of commutator brushes to determine the timing of current flow in the electric motor armature conductors brushless electric motors typically need some form of positional sensors that can be used to determine the timing of current flow.

Additionally, to maximise the efficiency of a brushless motor it is necessary to calibrate the electric motor, where various parameters are measured and stored in memory for use by a control unit when driving the electric motor, for example the offset between rotor position as determined by the electric motors positional sensors and the back EMF phase angle associated with the electric motor.

However, certain calibration procedures, for example positional calibration of the rotor, require that the rotor of the electric motor be turning with respect to the coils of the electric motor, which typically requires the use of a separate motor to turn the rotor while the electric motor is being calibrated.

It is desirable to improve this situation.

In accordance with an aspect of the present invention there is provided a control system and a method according to the accompanying claims.

This provides the advantage of allowing a sub-motor within an electric motor to rotate the electric motor's rotor relative to the electric motor's stator while calibration measurements are being performed on another sub-motor within the electric motor.

The present invention will now be described, by way of example, with reference to the accompanying drawings, in which.

Figure 3:
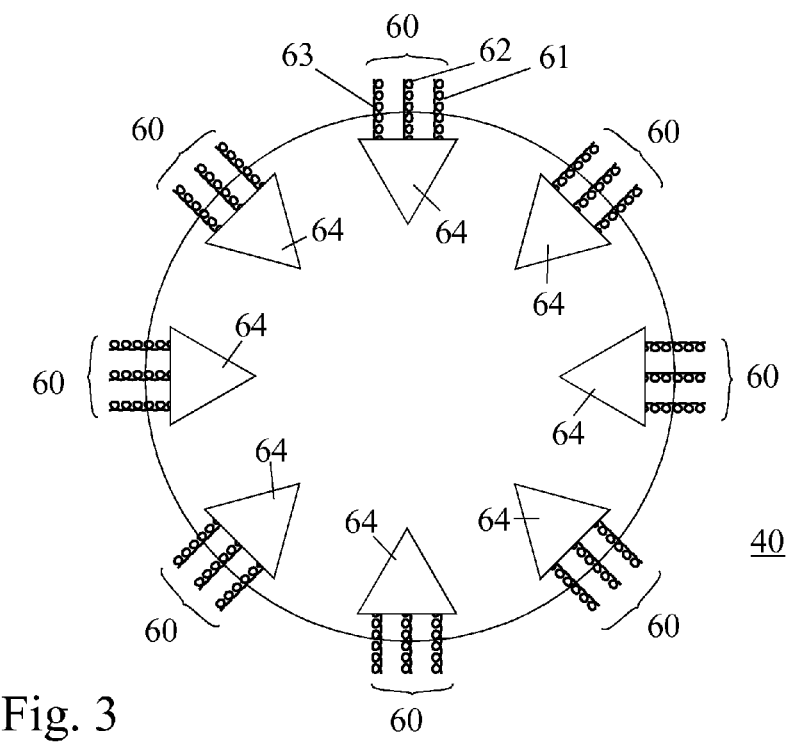
Figure 4:
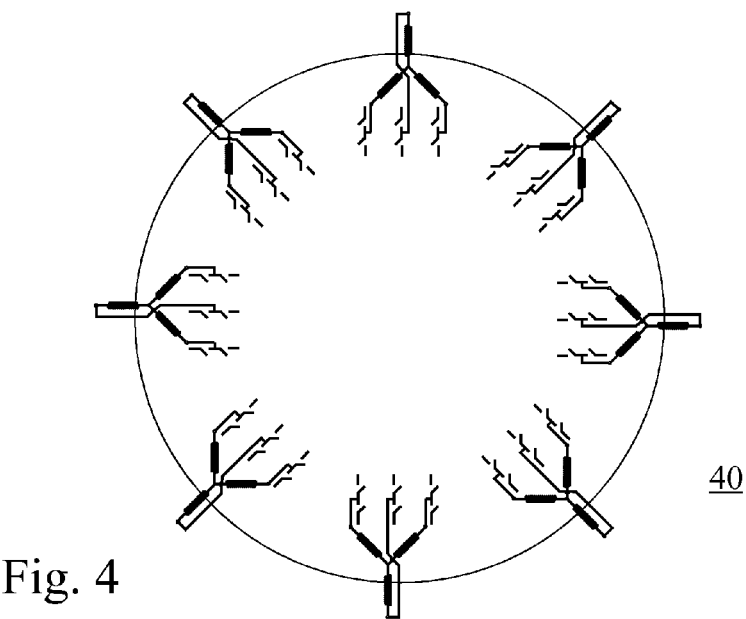
Figure 5:
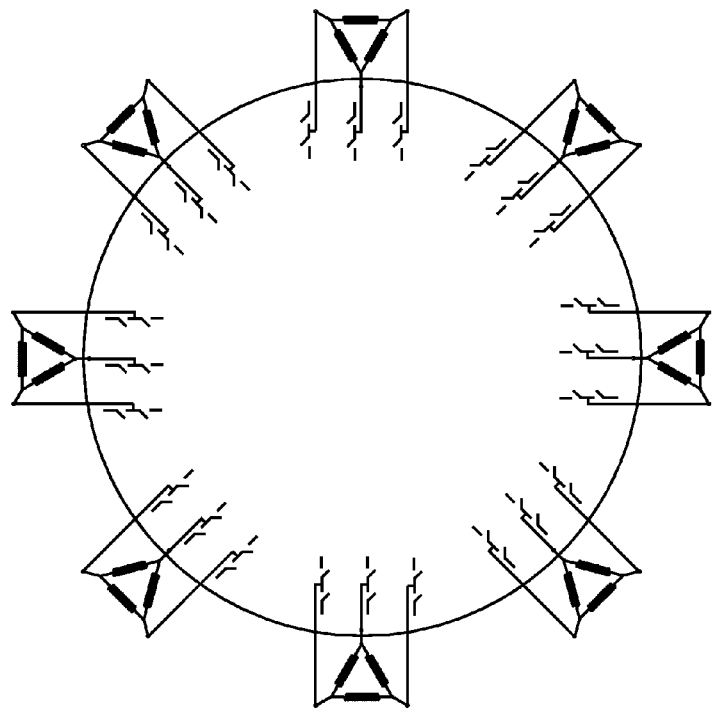
Figure 6:
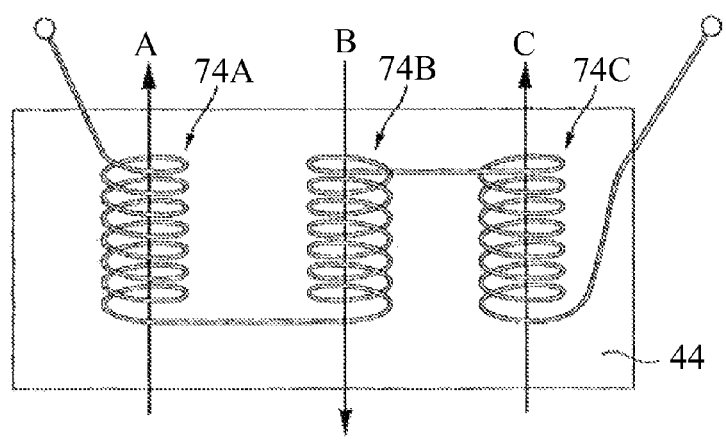
Figure 7:
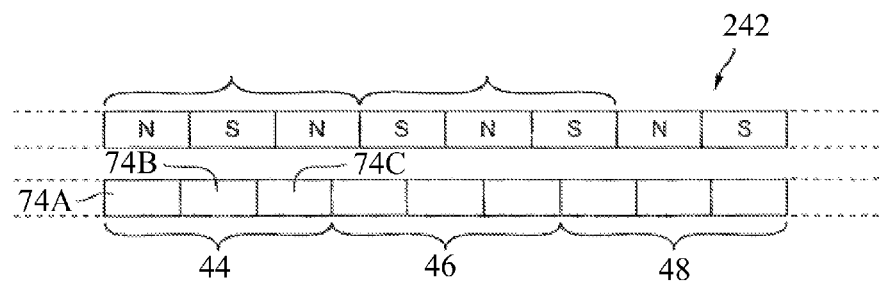
Figure 8:
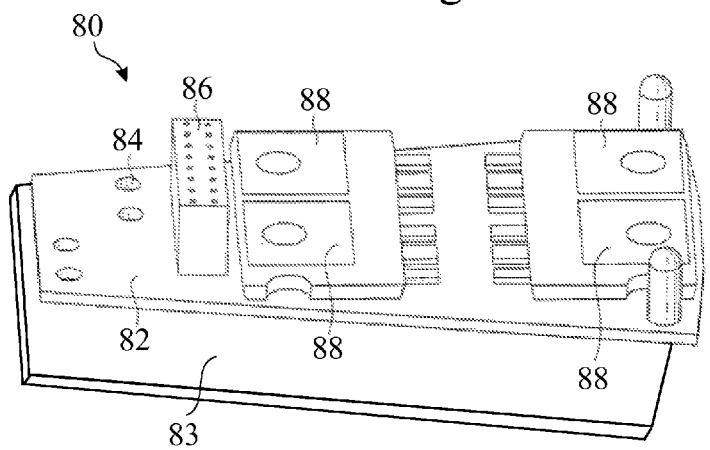
Figure 10:
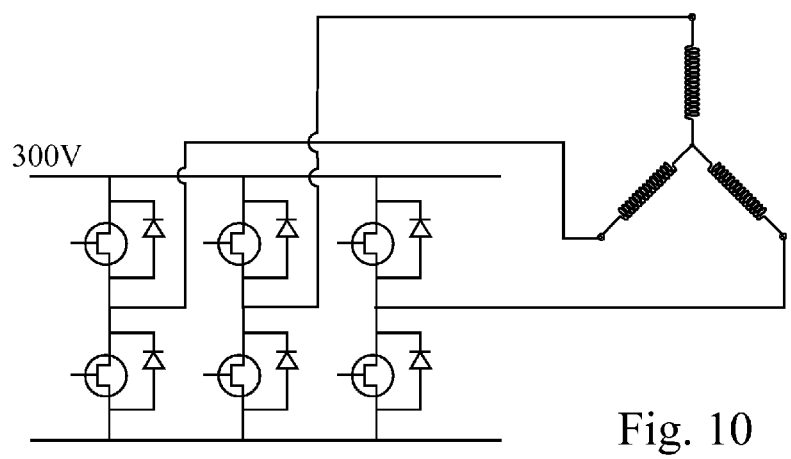
Figure 9:
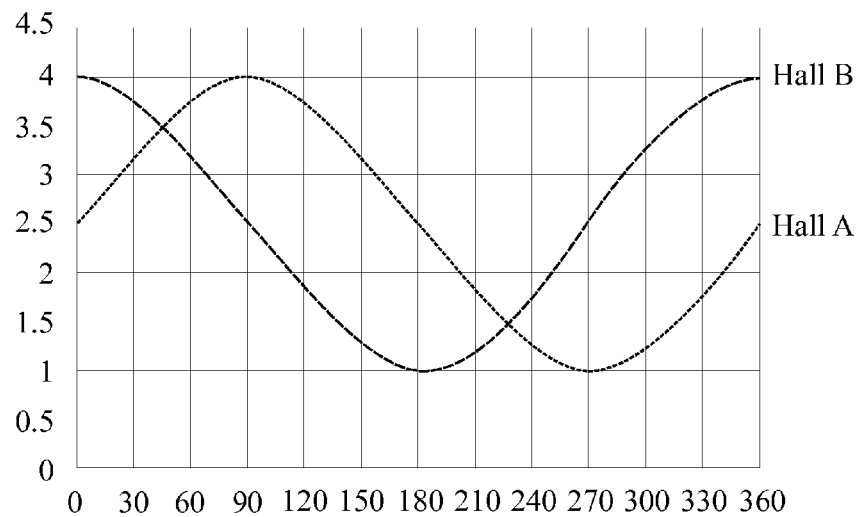
Figure 11:
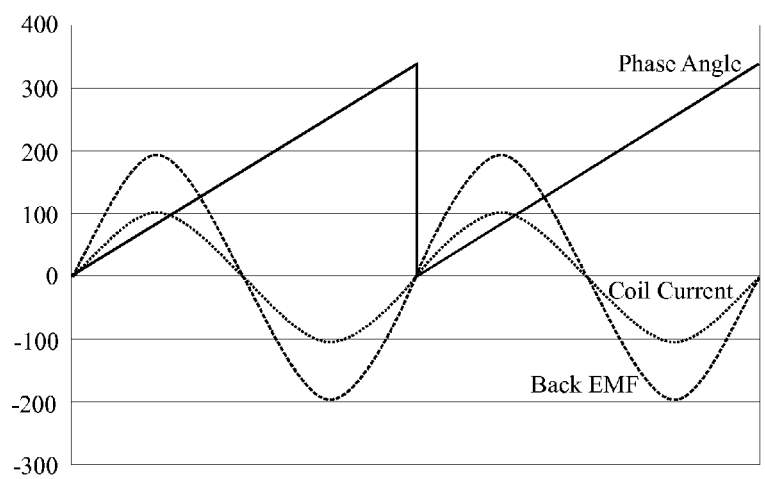

FIG. 3 schematically shows an example arrangement of coil sets for an electric motor according to an embodiment of the present invention;

FIG. 4 schematically illustrates the coil sub-sets of an electric motor according to an embodiment of the present invention that are configured in a wye configuration;

FIG. 5 schematically illustrates the coils sub-sets of an electric motor according to an embodiment of the present invention that are configured in a delta configuration;

FIG. 6 schematically shows an example arrangement of coils in one of the coil sub-sets according to an embodiment of the present invention;

FIG. 7 schematically shows the coils of the embodiment in relation to the magnets;

FIG. 8 schematically shows an example of a control device in accordance with an embodiment of the present invention;

FIG. 9 illustrates a Hall sensor signal trace;

FIG. 10 is a circuit diagram of the switching arrangement;

FIG. 11 illustrates a preferred relationship between rotor phase angle, back EMF and current.

Although the embodiment of the invention is described in the context of an electric motor for use in a wheel of a vehicle the invention is applicable to electric motors used in other applications. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. In addition, some of the aspects of the invention are applicable to an arrangement having the rotor centrally mounted within radially surrounding coils.

Figure 1:
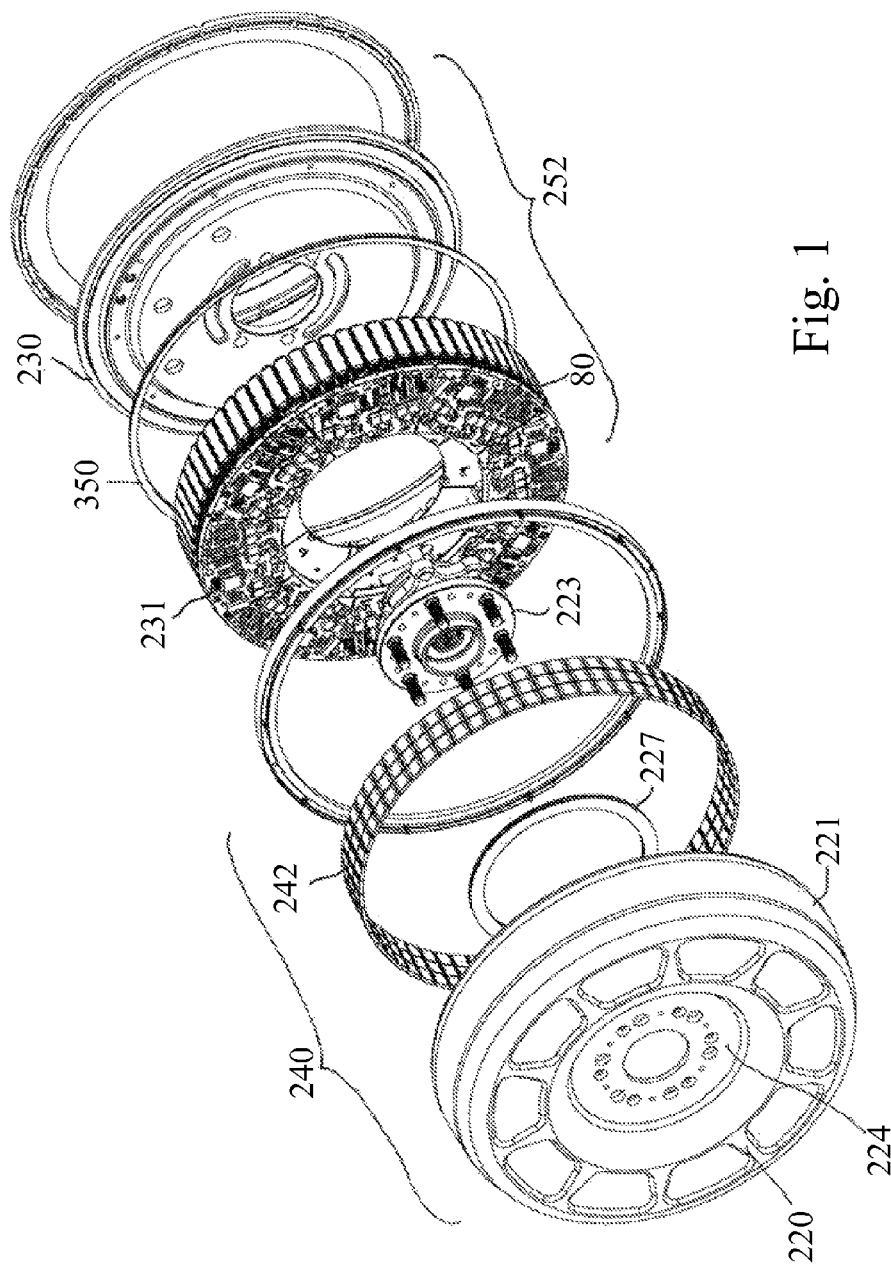
FIG. 1 illustrates an exploded view of a motor according to an embodiment of the present invention.
Figure 2:
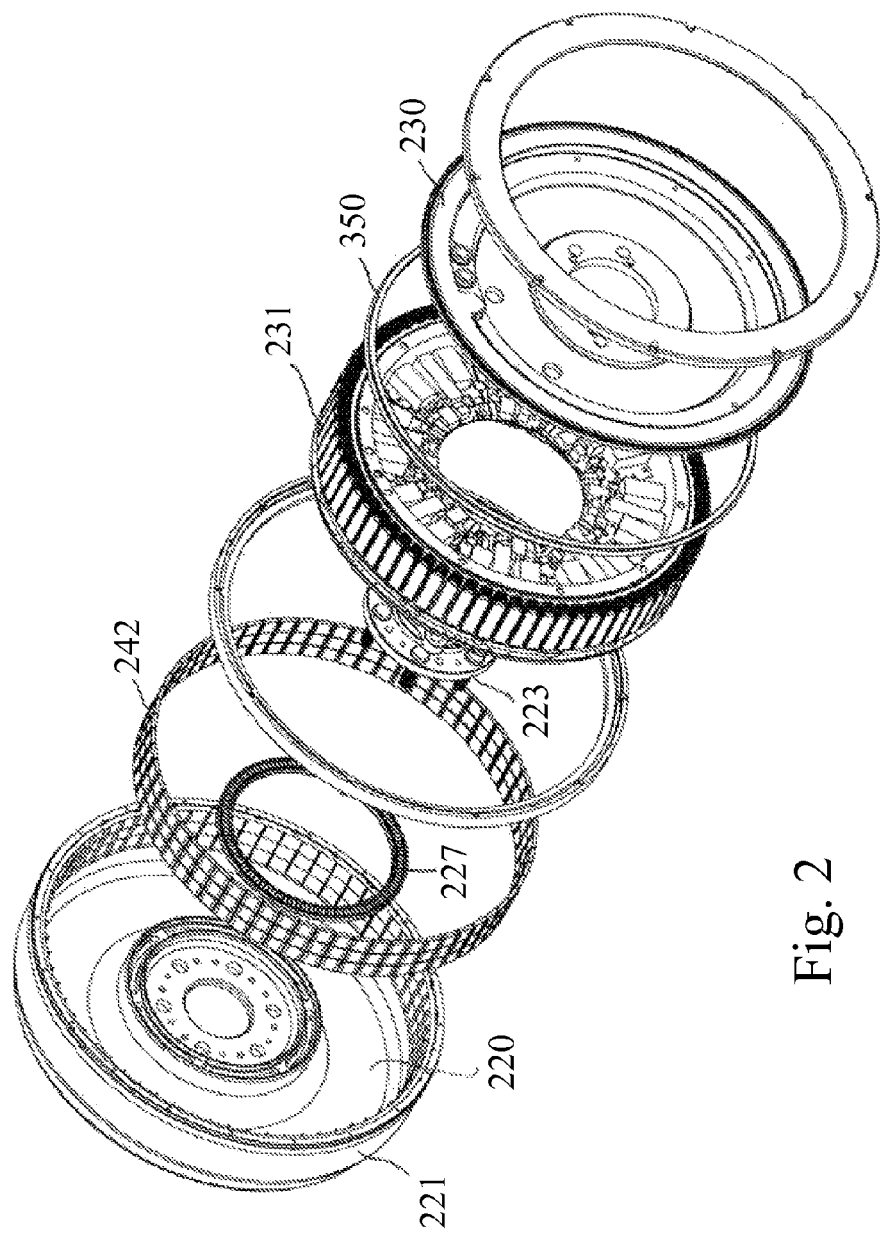
FIG. 2 is an exploded view of the motor of FIG. 1 from an alternative angle.

The physical arrangement of the embodying assembly is best understood with respect to FIGS. 1 and 2. The assembly can be described as a motor with built in electronics and bearing, or could also be described as a hub motor or hub drive as it is built to accommodate a separate wheel.

Referring first to FIG. 1, the assembly comprises a stator 252 comprising a rear portion 230 forming a first part of the housing of the assembly, and a heat sink and drive arrangement 231 comprising multiple coils and electronics to drive the coils as well as a heat sink. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

Although not shown, also mounted to the stator are a plurality of capacitor circuit boards for providing capacitance between the electric motor and the voltage supply to reduce voltage line drop.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 generate a force on the magnets 242 arranged around the inside of the cylindrical portion 221 of the rotor 240 thereby causing the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240.

The rotor also includes a focussing ring and magnets 227 for position sensing, as discussed below.

FIG. 2 shows an exploded view of the same assembly as FIG. 1 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block 223 at the central portions of the rotor and stator walls.

Additionally shown in FIG. 1 are control devices 80, otherwise known as motor drive circuits or inverters, carrying control electronics described below. Additionally in FIGS. 1 and 2 a V shaped seal 350 is provided between the circumferential wall 221 of the rotor and the outer edge of the stator housing 230. Further, in FIG. 2, the magnetic ring 227 comprising a commutation focusing ring and a plurality of magnets is provided for the purpose of indicating the position of the rotor with respect to the stator to a series of sensors arranged on the control devices 80 of the stator 252.

FIG. 3 schematically shows an example of an electric motor 40 in accordance with an embodiment of this invention. In this example, the motor is generally circular. However, it will be appreciated that embodiments of this invention can employ other topologies. For example a linear arrangement of coils for producing linear movement is envisaged.

The motor 40 in this example includes 8 coil sets 60 with each coil set 60 having three coil sub-sets 61, 62, 63 that are coupled to a respective control device 64, where each control device 64 and respective coil sub-sets form a three phase logical or sub electric motor that can be controlled independently of the other sub motors. The control devices 64 drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have any number of coil sub-sets. Equally, although the present embodiment describes an electric motor having eight coil sets 60 (i.e. eight sub motors) the motor could have two or more coil sets with associated control devices (i.e. two or more sub motors).

The motor 40 can include a rotor (not shown in FIG. 3) positioned in the centre of the circle defined by the positioning of the various coils of the motor, thereby to allow rotation of the rotor within the rotating magnetic field produced by the coils. Preferably, though, the rotor is arranged around the coils as previously disclosed in FIGS. 1 and 2. The rotor may typically comprise one or more permanent magnets arranged to rotate such that their poles sweep across the ends of the coils of the motor 40. Appropriate switching of currents in the coils of the coil sub-sets 61, 62, 63 allows synchronized attraction and repulsion of the poles of the permanent magnet of the rotor to produce the rotating action of the motor 40. It will be appreciated that FIG. 3 is highly schematic and, in practice, the coil sub-sets will be arranged at the outer periphery of the stator with the rotor magnets surrounding the coils.

Each control device includes a three phase bridge inverter which, as is well known to a person skilled in the art, contains six switches. The three phase bridge inverter is coupled to the three subset coils of a coil set 60 to form a three phase electric motor configuration. Accordingly, as stated above, the motor includes eight three phase sub-motors, where each three phase sub-motor includes a control device 64 coupled to the three sub-set coils of a coil set 60.

Each three phase bridge inverter is arranged to provide PMW voltage control across the respective coil sub-sets 61, 62, 63 to provide a required torque for the respective sub-motors.

For a given coil set the three phase bridge switches of a control device 64 are arranged to apply a single voltage phase across each of the coil sub-sets 61, 62, 63.

FIG. 4 illustrates the electric motor shown in FIG. 3, where each control device bridge inverter is coupled to their respective coil sub-sets to form a wye configuration.

FIG. 5 illustrates the electric motor shown in FIG. 3, where each control device bridge inverter is coupled to their respective coil sub-sets to form a delta configuration.

Preferably, the control devices are located in the same housing/casing as the other motor components, for example adjacent their respective coil set.

Each coil sub-set can include one or more coils. In this example, each coil sub-set includes three coils as is shown schematically in FIG. 6. In FIG. 6, these three coils are labeled 74A, 74B and 74C. The three coils 74A, 74B and 74C are alternately wound such that each coil produces a magnetic field which is anti-parallel with its adjacent coil/s for a given direction of current flow but having a common phase. As described above, as the permanent magnets of the rotor of the motor 40 sweep across the ends of the coils 74A, 74B and 74C, appropriate switching of the currents in the coils can be used to create the desired forces for providing an impulse to the rotor.

The reason that the coils 74A, 74B and 74C within each subset are wound in opposite directions to give antiparallel magnetic fields can be understood with respect to FIG. 7 which shows the arrangement of the magnets 242 on the rotor surrounding the coils 44, 46 and 48 of the stator. For simplicity, the arrangement is shown as a linear arrangement of magnets and coils, but it will be understood that in the embodiment of the invention described the coils will be arranged around the periphery of the stator with the magnets arranged around the inside of the circumference of the rotor, as already described.

The magnets 242 are arranged with alternate magnetic polarity towards the coil subsets 44, 46 and 48. Each subset of three coils 74A, 74B and 74C thus presents alternate magnetic fields to the alternate pole faces of the magnets. Thus, when the left-hand coil of a subset has a repelling force against a North Pole of one of the magnets, the adjacent central coil will have a repelling force against a South Pole of the magnets and so on.

As shown schematically in FIG. 7, the ratio of magnets to coils is eight magnets to nine coils. The advantage of this arrangement is that the magnets and coils will never perfectly align. If such perfect alignment occurred, then the motor could rest in a position in which no forces could be applied between the coils and the magnets to give a clear direction as to which sense the motor should turn. By arranging for a different number of coils and magnets around the motor, there would always be a resultant force in a particular direction whatever position the rotor and motor come to rest. Although the present embodiment describes a ratio of eight magnets to nine coils other ratios could be used, for example nine magnets to six coils.

FIG. 8 shows an example of a control device 80 in accordance with an embodiment of this invention.

The control device 80 includes a first circuit board 83 and a second circuit board 82. Preferably the second board 82 is arranged to overlay the first circuit board 83, as illustrated in FIG. 8.

The first circuit board 83 includes a plurality of switches that are arranged to apply an alternating voltage across the respective coil sub-sets. The switches can include semiconductor devices such as MOSFETs or IGBTs. In the present embodiment the switches comprise IGBT switches.

As described above, the plurality of switches are configured to form an n-phase bridge circuit. Accordingly, as is well known to a person skilled in the art, the number of switches will depend upon the number of voltage phases to be applied to the respective sub motors. In the present embodiment, in which the control devices and coil sub-sets are configured to form a three phase motor, the first circuit board 83 of the respective control devices include six switches. Although the current design shows each sub motor having a three phase construction, the sub motors can be constructed to have two or more phases.

The wires (e.g. copper wires) of the coil sub-sets can be connected directly to the switching devices as appropriate.

The second circuit board 82 includes a number of electrical components for controlling the operation of the switches mounted on the first circuit board 83. Examples of electrical components mounted on the second circuit board 82 include control logic for controlling the operation of the switches for providing PWM voltage control and interface components, such as a CAN interface chip, for allowing the control device 80 to communicate with devices external to the control device 80, such as other control devices 80 or a master controller. Typically the second control board 82 will communicate over the interface to receive torque demand requests and to transmit status information. Alternatively, the respective second circuit board could be incorporated into a single control board for controlling the operation of the switches on the respective first circuit boards.

Also mounted on each of the circuit boards is a sensor that can be used for determining the position of the rotor 240, for example a hall sensor that is arranged to generate an electrical signal dependent upon the relative position of the focusing ring and magnets 227 that are mounted on the rotor 240. To determine the direction that the rotor is turning preferably the circuit boards include two sensors that are offset by a predetermined angle so that the changes in signal from each of the sensors can be analyzed to determine both the relative position of the rotor 240 and the direction of rotation of the rotor. Preferably, to allow each control device, and hence each sub motor, to operate independently of each other each circuit board has their own set of position sensors.

By way of illustration, FIG. 9 illustrates a typical Hall sensor trace for two Hall sensors mounted on a circuit board. The two Hall sensors are separated by a predetermined distance such that when the first Hall sensor provides a signal indicative of a zero phase angle the second Hall sensor provides a signal indicative of a 90 degree phase angle. By analyzing the relative change in phase angle between the signals generated by the first and second Hall sensors it is possible to determine the direction of rotation of the rotor relative to the stator.

FIG. 10 illustrates six switches mounted on the first circuit board arranged in a 3 phase bridge configuration. The switch arrangement is coupled to the coil sub-sets of a coil set, where the coil sub-sets are placed in a wye configuration. The six semiconductor switches are connected to a voltage supply, for example 300 volts, and to ground. Pairs of the respective coil sub-sets are connected between two legs of the bridge circuit. Simplistically, to operate the motor, the switches are operated in pairs, one in the top half of the bridge and one from a different leg in the bottom half of the bridge. Typically, each switch carries the output current for one third of the time.

To change the direction of rotation of the motor, the timing and polarity of the current flow in the coil is changed to cause the resulting forces in the opposite direction. As described above, the technique of pulse width modulating is used to pulse width modulate the signal applied to the gate of the semiconductor switches to control the voltage applied to the coils, where the PWM voltage is determined based upon a received torque demand request. The PWM voltage in turn determines the coil current and hence the produced torque.

Preferably, for each sub motor within the electric motor the electrical phase angle applied to the sub-motors associated coil set will be synchronized with the rotor phase angle, where the rotor phase angle is determined using Hall sensors. Accordingly, the application of a voltage to a coil subset will be dependent upon the position of the rotor relative to the stator. FIG. 11 illustrates a preferred relationship between phase angle of the rotor, the electrical phase angle and the current, where a zero voltage, and hence current, correspond to a zero rotor phase angle.

However, to compensate for possible variations in the position of Hall sensors mounted on the circuit boards and to ensure that the preferred relationship between rotor and electrical phase angle is maintained, it is typically necessary to calibrate the phase angle for each control device within the electric motor.

Typically the calibration process involves determining the offset between the zero phase rotor position and the zero electrical phase angle. If the zero phase rotor position and zero electrical phase angle do not correspond it is necessary to determine what the offset is between the two values.

The calibration process is performed by utilizing one of the electric motor's sub-motors to rotate the rotor, thereby allowing a back EMF to be measured in the coil sets associated with the other sub-motors. The electrical phase angles associated with the measured back EMF values are then compared with the rotor position, as determined by the Hall sensors, to determine the phase angle offset for the different control devices.

By way of illustration, this process is performed using a controller to provide a torque demand to one of the electric motor control devices, thereby causing the rotor to rotate relative to the stator. No torque demand is provided to the other sub-motors (i.e. substantially no voltage will be applied to the coil sets for the other sub-motors via their respect control devices). Accordingly, substantially no current is allowed to flow in the coils associated with the other sub-motors. For example, the coils associated with the other sub-motors are placed in an open circuit configuration. While the rotor is rotating both the rotor phase angle and the back EMF are measured for each sub-motor that is not being provided with a torque demand (i.e. the sub-motors where substantially no current is flowing in the associated coils). The phase offset value between the rotor phase angle and the electrical phase angle for the respective sub-motors is then determined When performing the calibration, typically the electrical phase angle will be zero when the back EMF is zero.

Once phase angle offset values have been determined for the sub-motors with non-active coil sets, a phase angle offset is then determined for the sub-motor that had been used to drive the rotor. To measure the phase angle offset for the remaining sub-motor the torque demand being sent to that sub-motor is set to zero and one of the sub-motors that has had their phase angle offset calculated is provided with a torque demand, thereby causing a torque to be generated and causing the rotor to rotate relative to the stator. The rotor phase angle and electrical phase angle, determined from the back EMF, is then measured and a phase angle offset value is determined.

Accordingly, for an electric motor having a plurality of sub-motors, by measuring the back EMF generated within non-active coil sub-sets for a sub-motor while another sub-motor is being used to rotate the rotor relative to the stator allows the phase offset between the Hall sensor phase angle and the electrical phase angle to be determined for the sub-motor that has non-active coil sub-sets.

The controller arranged to generate the torque demand signals for controlling the operation of the respective sub-motors, and which performs the necessary measurements to determine the phase offset values, can be located external to the electric motor or be mounted within the electric motor. Alternatively, the controller functions can be split between two controllers, one located within the electric motor while the other controller is located external to the electric motor.

If the controller is located external to the electric motor, the controller can also act as a master controller that is arranged to control the overall operation of the vehicle to which the respective in-wheel electric motors are mounted.

The torque demand signals are communicated to the respective in-wheel electric motor control devices 80 either directly or indirectly via a common control device. The torque demand signals will typically be communicated via the communication bus, for example a CAN bus. However, as would be appreciated by a person skilled in the art, the signals can be communicated by any suitable means. Additional control signals can be communicated by the controller to the respective control devices 80.

The measured Hall sensor signals and back EMF values can be communicated to the controller via the communication bus.

The invention claimed is:

1. A control system for an electric motor having a plurality of coil sets independent from each other, wherein a first control device is arranged to control current in a first coil set for generating a first torque on a rotor and a second control device is arranged to control current in a second coil set for generating a second torque on the rotor, the system comprising a controller arranged to instruct the first control device to control current in the first coil set having at least three phase windings to generate a torque on the rotor to allow rotation of the rotor; and means for measuring a characteristic associated with the second coil set having at least three phase windings resulting from the rotation of the rotor from the torque generated by the first coil set while no current or the equivalent of no current is flowing in all of the phase windings of the second coil set.

2. A control system according to claim 1, wherein the rotor includes magnets and the measured characteristic associated with the second coil set is a voltage induced in the second coil set from the rotor magnets moving relative to the second coil set.

3. A control system according to claim 2, further comprising means for determining a phase angle of the rotor with respect to the second coil set, wherein the controller is arranged to determine an offset between the measured phase angle and the phase of the measured voltage induced in the second coil set.

4. A control system according to claim 3, wherein the means for determining a phase angle uses data from two Hall sensors incorporated within the electric motor.

5. A control system according to claim 4, wherein the means for determining a phase angle uses voltage fluctuations from the Hall sensors that result from magnets located on the rotor.

6. A method of measuring an electric motor characteristic for an electric motor having a plurality of coil sets independent from each other, wherein a first control device is arranged to control current in a first coil set for generating a first torque on a rotor and a second control device is arranged to control current in a second coil set for generating a second torque on the rotor, the method comprising controlling the current in the first coil set having at least three phase windings to generate a first torque on the rotor to allow rotation of the rotor; and measuring a characteristic associated with the second coil set having at least three phase windings resulting from the rotation of the rotor from the torque generated by the first coil set while no current or the equivalent of no current is flowing in all of the phase windings of the second coil set.

7. A method according to claim 6, wherein the rotor includes magnets and the measured characteristic associated with the second coil set is a voltage induced in the second coil set from the rotor magnets moving relative to the second coil set.

8. A method according to claim 7, further comprises determining a phase angle of the rotor with respect to the second coil set, wherein the controller is arranged to determine an offset between the measured phase angle and the phase of the measured voltage induced in the second coil set.

* * * * *